Oct. 9, 1945.　　J. E. STORMENT　　2,386,366
DIOLEFIN RECOVERY
Filed Feb. 4, 1943　　3 Sheets-Sheet 3

INVENTOR.
J. E. STORMENT
BY Hudson, Young & Yinger
ATTORNEYS.

Patented Oct. 9, 1945

2,386,366

UNITED STATES PATENT OFFICE 2,386,366

DIOLEFIN RECOVERY

Joseph Edgar Storment, Bartlesville, Okla., assignor to Phillips Petroleum Company, a corporation of Delaware Application February 4, 1943, Serial No. 474,723

12 Claims. (Cl. 260—681.5)

This invention relates to the recovery of aliphatic conjugated diolefins from hydrocarbon mixtures, especially of butadiene from gaseous hydrocarbon streams, by means of a solid reagent containing a cuprous halide especially cuprous chloride.

Heretofore recovery of diolefins by means of cuprous halide reagents has been done in an entirely or substantially a batchwise manner, the usual method being to pass the diolefin-containing hydrocarbon stream through a stationary bed of the solid reagent, discontinue the flow when the reagent is loaded with diolefin, direct the feed through another bed, and desorb the diolefin from the first bed. Both absorption and desorption have been carried out batchwise. This is inconvenient and expensive. Moreover, the problem of getting satisfactory heat transfer to the stationary solid reagent bed has not been satisfactorily solved to my knowledge.

The principal object of the present invention is to provide an improved method and apparatus for the recovery of aliphatic conjugated diolefins by means of a solid cuprous halide reagent. Another object is to effect such a recovery continuously. Another object is to eliminate the heat transfer problem in the absorption, desorption and reagent cooling step. Numerous other objects will hereinafter appear.

In the accompanying drawings:

Figure 1 portrays diagrammatically one arrangement of equipment found particularly satisfactory in the recovery of diolefins in accordance with the present invention. In this embodiment, continuously operated barrel valves are used in feeding and withdrawing the solid reagent to and from the conveyors.

Figure 1:
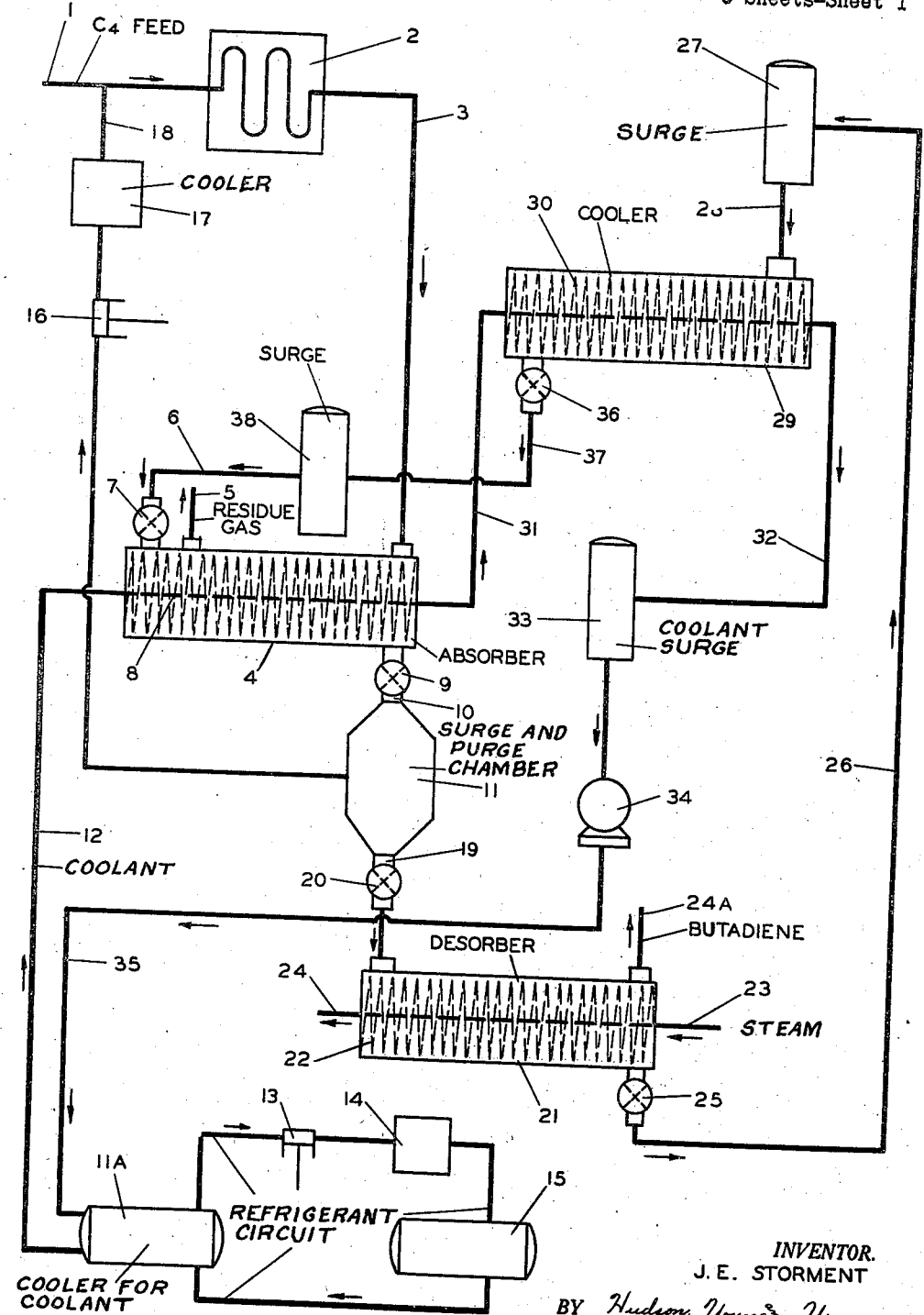

The solid cuprous halide reagent employed in accordance with the present invention comprises a cuprous halide capable of forming an addition compound with aliphatic conjugated diolefins. Usually this halide is cuprous chloride, although it may be cuprous bromide, iodide, or fluoride. The halide may be used in the form of the powder, or it may be admixed with other solids such as asbestos, sand, pumice, etc. The reagent may contain a small but suitable amount of a lubricant to facilitate its movement by the mechanical means hereinafter disclosed, reduce abrasion and wear, and lessen power requirements. Examples of suitable lubricants are graphite, lubricating oil, etc.

The solid reagent may conveniently be made by impregnating a solid adsorbent carrier with the cuprous halide as disclosed in application of Schulze et al., Serial No. 354,086, filed August 24, 1940. However, it is preferred to use a solid reagent comprising the powdered cuprous halide in admixture with sawdust impregnated with lubricating oil, as disclosed in the application of Short et al., Serial No. 408,078, filed August 23, 1941. A solid reagent comprising powdered cuprous halide and a fibrous non-adsorbent carrier such as asbestos fibers or cellulose fiber, as disclosed in the application of Schulze et al., Serial No. 408,372, filed August 26, 1941, may also be used.

In accordance with my invention, aliphatic conjugated diolefins are recovered from hydrocarbon fluids—gaseous or liquid but preferably the former—in a continuous manner by feeding said fluid through an absorption zone comprising a conveyor or shell or chamber equipped with conveying means, preferably a screw conveyor, the conveyor means being provided with a closed passageway through which a cooling medium is circulated. The conveyor moves the solid reagent through the conveyor and also serves to agitate the reagent into intimate contact with the diolefin-containing stream. At the same time the cooling medium circulated through the conveyor means serves by indirect heat exchange to remove the heat of absorption and to keep the reagent and absorption zone at the proper temperature for good absorption. As is now well known, the temperature for cuprous halide absorption of diolefins is relatively low, namely between about 0° F. and about 80° F., and usually between about 30° F. to about 60° F.

Preferably the hydrocarbon fluid being extracted whether liquid or gaseous, is passed countercurrently to the solid reagent in the absorption zone, although concurrent flow may less preferably be utilized.

The extracted hydrocarbon fluid, usually essentially diolefin-free, is removed from the absorber at the end opposite introduction of the feed.

The solid reagent leaving the absorber and usually substantially saturated with the diolefin is passed into a desorbing unit which is constructed similarly to the absorber except that a heating fluid is passed through the passageways in its conveyor means. Also, of course, no inlet for hydrocarbon fluid is provided, the desorbed diolefin being removed by a suitable outlet separately from the desorbed reagent.

Preferably suitable means are provided in association with the absorber and desorber for allowing continuous removal of solid reagent without allowing substantial amounts of hydrocarbon fluid to be removed in admixture therewith. A preferred method of effecting this removal without allowing intercommunication of gases to any substantial degree between the absorber or desorber and subsequent processing equipment is to employ continuously operated barrel valves. If desired, the feeding of the solid reagent into the conveyor units may also be accomplished by similar means for sealing against flow of gases. In this way the absorption and desorption units may be isolated from one another and from the reagent cooling unit hereinafter described, for optimum operation of each unit substantially sealed from gas or liquid communication with the others.

It is preferred to maintain the hydrocarbon fluid in the gaseous phase during the absorption. This is advantageous for many reasons, among which are the avoidance of the disturbance and dissolution of cuprous halide from the solid reagent which would occur were hydrocarbon fluid in the liquid phase present in or removed from the absorption unit, simplification of the problem of hydrocarbon and reagent feeding and withdrawal so that reagent may, for example, be withdrawn with a minimum or unreacted hydrocarbons in admixture therewith whereby the subsequent purging step is simplified and contamination of the product diolefin is prevented.

If desired, maintenance of the hydrocarbon in the gaseous phase may be expedited by admixture with an inert non-condensible gas, as disclosed in the application of Schulze, Serial No. 428,774, filed January 29, 1942.

Preferably the diolefin-loaded reagent withdrawn from the absorption unit is passed into a relatively large closed chamber from which reagent is withdrawn and passed to the desorption unit. This large closed chamber combines the functions of an accumulator and a surge vessel and in addition is preferably provided with means for flushing or purging any residual hydrocarbon fluid from the solid reagent prior to its admission to the desorber. By thus purging, very high purity of the desorbed diolefin liberated in the desorber is attained, since contamination by residual non-diolefinic hydrocarbons left in the void spaces of the reagent or occluded thereby is prevented.

This purge is conveniently effected by application of a vacuum to the surge vessel just described. The purged hydrocarbons may contain small amounts of diolefins in which case it is desirable to recycle them to the incoming feed.

Alternatively to a vacuum, I may purge the reagent as it is being transferred to the desorbing unit by sweeping with an inert non-condensible gas readily separable from the diolefins being recovered or with pure diolefin itself. The use of pure diolefin as a purging medium is disclosed in the application of H. E. Drennan, Serial No. 353,308, filed August 19, 1940. Also I may wash impurities from the reagent with a liquefied gas readily separable from the diolefin by taking advantage of the difference in boiling points. An example of such a washing agent is liquid propane where butadiene is being recovered or liquid normal butane where pentadienes (isoprene or piperylene) are being recovered. This is disclosed in the application of Schulze et al., Serial No. 428,773, filed January 29, 1942.

The temperatures required for desorption of the diolefin-cuprous halide complex are well known to those skilled in the art. Usually they range from about 125° F. to about 225° F.

If desired, the desorption may be facilitated by the employment of a suitable heated gas in conjunction with the heated screw conveyor adverted to above. Use of an inert non-condensible gas for this purpose is disclosed in the application of Short, Serial No. 430,267, filed February 10, 1942. Use of pure diolefin for this purpose is disclosed in the Drennan application, Serial No. 353,308, above identified.

Ordinarily, however, the desorption is conducted under the usual conditions, namely at atmospheric to moderately elevated pressures, and with simple venting of the liberated diolefin from the desorber. Usually the diolefin is removed from the conveyor shell at the same end as the regenerated or desorbed solid reagent but separately therefrom.

The desorbed hot reagent withdrawn from the desorber is then passed to a cooler which is provided with a hollow screw conveyor, cooled by a suitable coolant conveniently the coolant which has left the absorber. The purpose of the cooling unit is to bring the temperature of the solid reagent down to the absorption temperature.

Preferably a surge vessel is provided for the solid reagent intermediate the desorber and the cooler. If desired, the reagent in the surge vessel may be evacuated or otherwise purged of residual diolefin carried by the reagent leaving the desorber.

Following cooling, the solid reagent is transferred to the absorber, again preferably by way of a surge vessel.

Desirably, but not necessarily, means is provided between the cooler and absorber and between the cooler and desorber for sealing against flow of gases while allowing continuous transfer of solid reagent. This may conveniently take the form of barrel valves as before. This means need not be employed in case means is provided to isolate the absorber and desorber from gaseous intercommunication with one another by way of the cooler, and surge vessels and transfer lines and means associated with the cooler. In this way the necessity for using barrel valves or other means such as the sealing ends of the screw conveyor, in association with each end of the cooler is overcome.

It will be understood that while it is preferred to arrange the absorber, desorber and cooling units horizontally, they may be arranged vertically or at any desired angle.

The principal purpose of the surge vessels intermediate the several units is to take care of any minor differences in flow in the several parts of the system. They also provide a means for purging the reagent accumulating therein.

From the foregoing it will be seen that the invention provides a cyclic continuous flow of solid reagent through the several zones. Provision may be made for feeding fresh solid reagent to the system at any suitable point and for removing reagent at another point. For example, it may be desirable to collect and remove fines at a point in the system. These fines may inevitably accumulate to a minor extent as a result of the mechanical action involved in the process.

Referring now to Figure 1, a diolefin-containing hydrocarbon feed, such as for example, a butadiene-containing C₄ feed, in liquid phase, enters the system via line 1 and passes through heater 2 which vaporizes it and brings it to an absorption temperature and pressure, suitably 50° F. and 5 lbs. gauge, whereupon it is passed via line 3 to absorber 4. If desired, heater 2 may be by-passed, the feed being fed to unit 4 at least partially in liquid phase whereby the heat of absorption is at least partially removed or compensated by the heat of vaporization of the unreacted hydrocarbons. Where the feed is in vapor form at the proper absorption temperature, heater 2 may of course be eliminated.

In absorber 4 the hydrocarbons pass leftwardly countercurrently to and in intimate contact with the solid reagent and the residue gas, essentially or completely free from diolefins, leaves via line 5. The solid reagent at the proper temperature is fed into the shell of absorber unit 4 by means of line 6 and barrel valve 7 and is moved through unit 4 by means of screw 8 which is hollow or provided with internal cooling passageways. The reagent is removed via barrel valve 9 and line 10.

Coolant for unit 4 is supplied as follows. Naphtha is cooled, say to —30° F., in cooler 11A and fed via line 12 to the conveyor screw in unit 4. Cooler 11A is cooled by expansion of liquid propane or other refrigerant liquefied by means of compressor and condenser 14 and stored in surge vessel 15.

The solid reagent bearing the diolefin is passed by barrel valve 9 directly into reagent surge vessel 11 which is purged by evacuation by vacuum pump 16. Desirably the evacuated gases are cooled in cooler 17 and recycled via line 18 to the feed line 1.

From surge vessel 11 the purged reagent is fed via line 19 and barrel valve 20 into desorption unit 21 which is provided with heated screw conveyor 22 through which is passed countercurrently to reagent flow a suitable heating medium such as steam fed in by line 23 and removed via line 24. The desorber may be operated at say 200° F. and 5 lbs. gauge. The desorbed diolefin is withdrawn via line 24A and is thence passed to storage or to subsequent processing steps. Operating as shown, the purity of the desorbed butadiene exceeds the 95% minimum specification.

The desorbed reagent is removed from unit 21 by means of barrel valve 25 and passed by any suitable means diagrammatically designated by line 26 to surge vessel 27 which may or may not be provided with purging means to remove residual free diolefin contained in the reagent mass. From vessel 27 the reagent is passed by any suitable means denoted by line 28 (which may be equipped with a barrel feeding valve if desired) into reagent cooler 29 where it is brought down to the absorption temperature, say 50° F., by contact with hollow conveyor screw 30 through which is passed countercurrently the naphtha or other coolant liquid leaving absorber 4 by means of line 31.

The coolant leaves cooler 29, at say —10° F., by way of line 32 which conducts it to coolant surge tank 33 whence it is fed by pump 34 and line 35 through cooler 11A into line 12 for recirculation.

The cooled reagent leaves cooler 29 via barrel valve 36 and passes via line 37 to surge vessel 38 whence it is fed via line 6 to barrel valve 7 and absorber 4, completing the cycle.

It will be obvious that while the reagent flow is indicated by flow lines these lines may in practice include screw conveyors, elevators and other suitable means for moving the reagent. It is preferred that the system be closed and the reagent and hydrocarbon kept from contact with atmospheric air, atmospheric moisture or other form of moisture in order to keep corrosion problems and dilution of the diolefin product at a minimum. It has been found that ordinary carbon steel may be used as the construction material with no corrosion problems as long as no air or moisture is present. It is necessary to dehydrate the feed if it contains any appreciable amounts of water.

Figure 2:
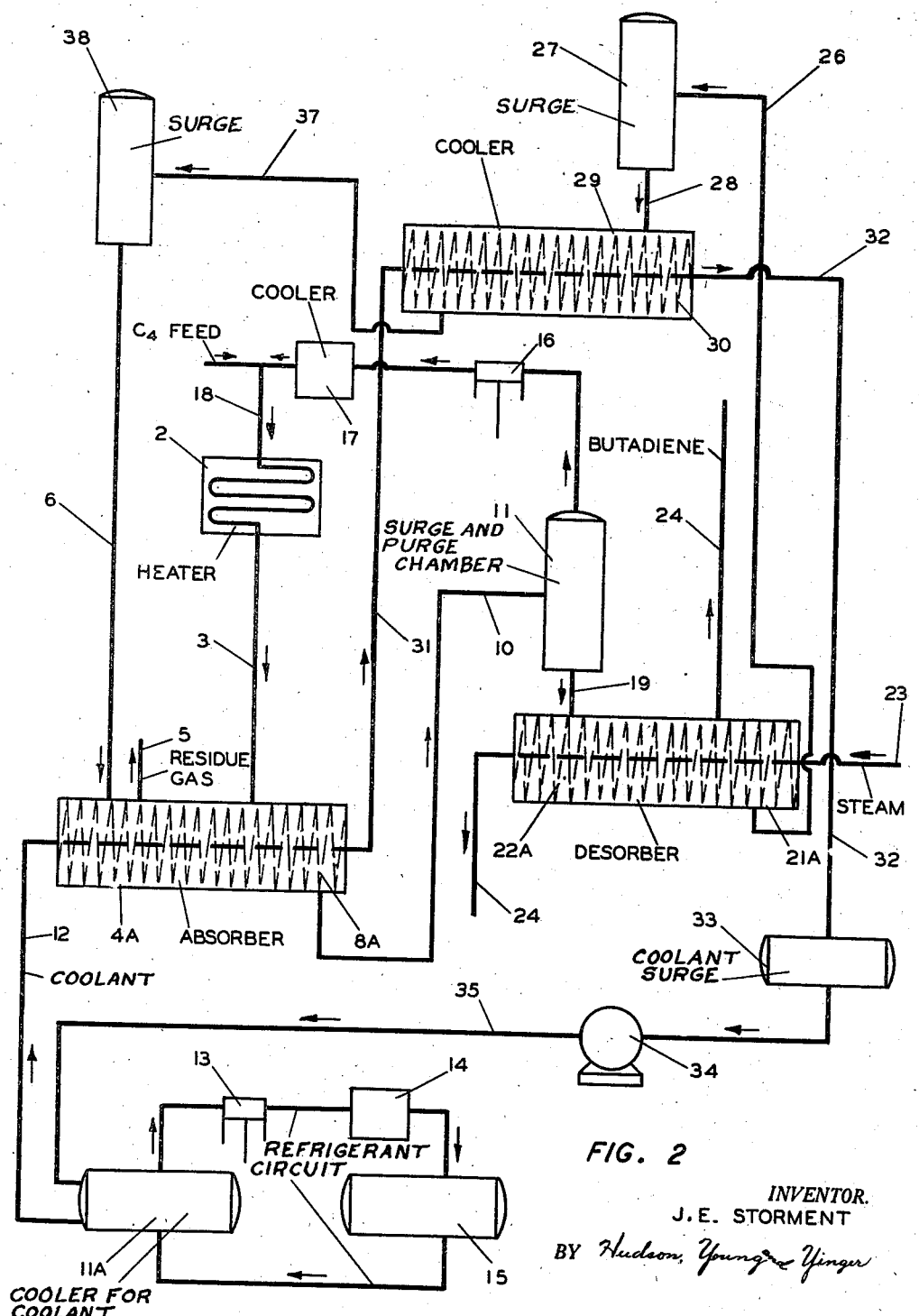
Figure 2 illustrates a modification wherein the absorption and desorption units are sealed by the ends of the screw conveyors therein.
Figure 3:
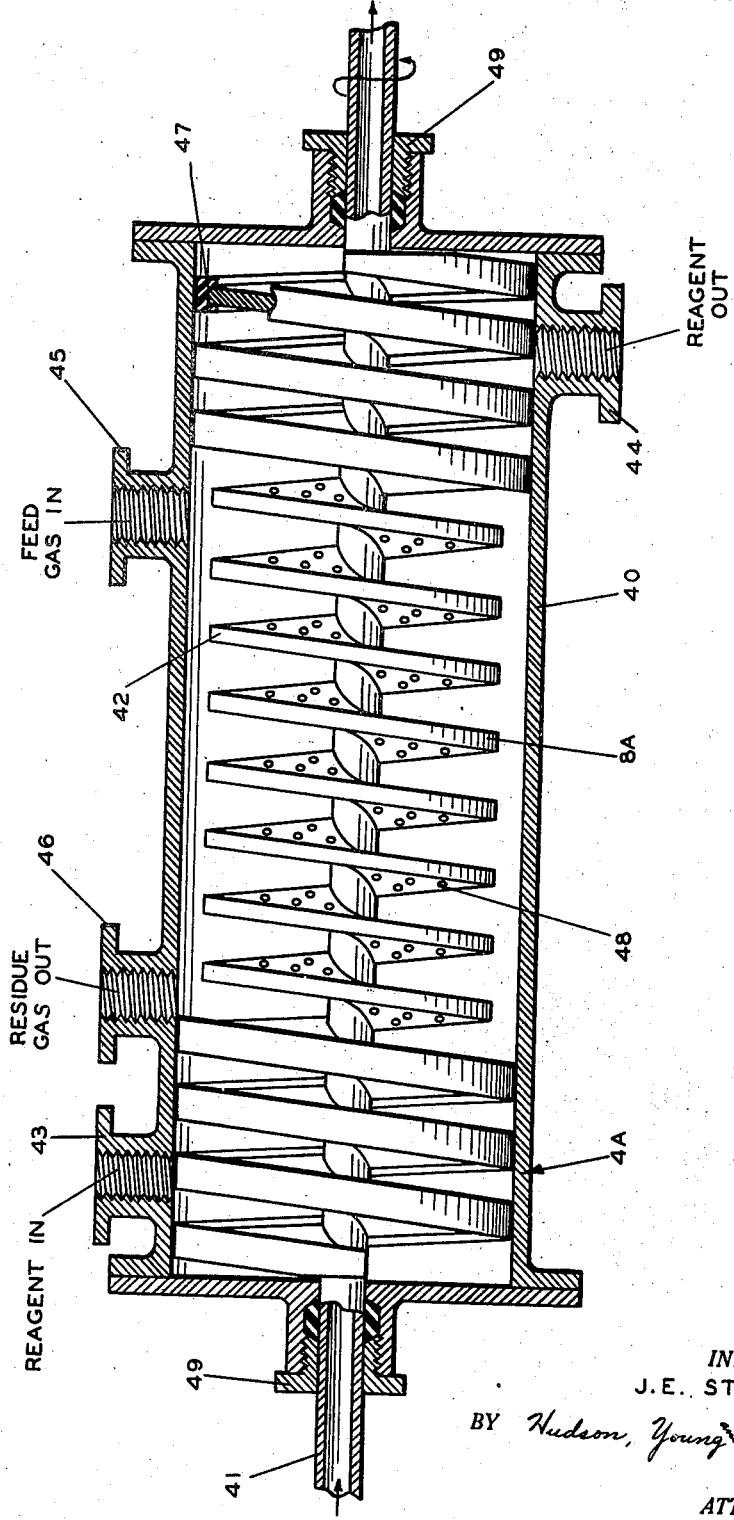
Figure 3 is a detailed sectional view of the absorption unit used in Figure 2.

In Figure 2, the arrangement is exactly the same as in Figure 1, except that barrel valves 7, 9, 20 and 25 for sealing the absorber 4A and the desorber 21A are eliminated and their function performed by using screw conveyors 8A and 22A constructed as shown in Figure 3 and the ends of which seal against the flow of gas but allow entry and exit of solid reagent. Flow lines 26 and 37 may embody barrel valves, or conveyor screw 30 in cooler 29 may be provided, if desired, at its ends with gas sealing means as shown in Figure 3.

Referring to Figure 3, the absorber 4A comprises a closed conveyor shell 40 in which is rotatably and sealingly journaled screw conveyor 8A which is driven in any suitable way and comprises a hollow shaft 41 which acts also as a passageway for the cooling medium.

Helical fins 42 are attached to the shaft 41 so that as it rotates the solid reagent is moved through vessel 40 from the reagent inlet 43 to the outlet 44. The feed hydrocarbon enters via inlet 45 and the residue gas leaves via outlet 46.

Those convolutions of helical fins 42 which lie between gas inlet 45 or outlet 46 and the end of the conveyor shell 40 are made to fit tightly against the wall by means of suitable packing material 47 secured to the edges of the fins in such manner as to seal against gas leakage while allowing rotation.

The intermediate convolutions are provided with means for allowing free passage of gas through the fins in order to promote contact and make the flow resistance comparable to that of a similar cylindrical body of the solid reagent without the moving means. This may take the form of perforations 48 where the fins are solid, or of tubular inserts where the fins are hollow for passage of a heat exchange medium. These openings should be small or else screened to prevent slippage of the reagent mass therethrough as the conveyor is rotated.

If desired, the conveyor fins 42 may be hollow or cored or otherwise provided with passageways for the coolant, and shaft 41 may be solid through most of its length. In some cases a tube may be helically mounted on the flights of the conveyor, especially on the reverse face of said flights, and the coolant passed through this tube.

Leakage around shaft 41 may be prevented by the packing glands 49. Means (not shown) may be provided for turning the shaft and for feeding the coolant to the rotating shaft and withdrawing it therefrom, the latter being accomplished by devices well known in the art for effecting a fluid-tight seal between rotating and stationary pipes or tubes.

The intermediate fins (those lying between pipe connections 45 and 46) may closely or tightly contact the walls of shell 40, or may be substantially smaller in diameter.

By omitting the perforations from the sealing convolutions of the screw conveyor 8A, a substantial gas-tight seal is provided since the resistance to helical gas flow through the mass of the reagent lying between those convolutions is so great that no substantial flow of gas results, yet free flow of the solid into and out of the unit is assured.

The construction of the desorber 21A is the same as that of absorber 4A except that connection 46 is not used and connection 45 is used for efflux of the desorbed butadiene, and heating liquid is passed through the hollow conveyor, preferably in a direction opposite to that shown in Figure 3. Construction of cooler 30 may be the same as that of Figure 1, or it may be similar to that of Figure 3 where it is desired to use the sealing end flights for isolating cooler 30 against gas flow.

Example

A liquid $C_4$ feed of 353 barrels per day containing 37.7% liquid volume per cent of butadiene is brought to a temperature of 50° F. and passed through an absorber 4A as shown in Figure 2, through the conveyor shaft of which is passed 350 gallons per minute of naphtha at −30° F. Solid cuprous chloride reagent is moved through absorber 4A by means of the screw 8A. Absorber 4A is four feet in diameter and forty feet in length and effects interchange of 858,000 B. t. u. per hour. The reagent is fed through the system at the rate of 168 cubic feet or 7140 pounds per hour. The reagent leaving the absorber is subjected to a vacuum of 2 pounds absolue at 50° F., and is then fed to desorber 21A which is maintained at 200° F. by the passage of steam through the conveyor screw 22A at a rate such as to supply 1,286,000 B. t. u. per hour. Desorber 21A has the same dimensions as absorber 4A.

Desorbed butadiene is withdrawn via line 24 at the rate of 126 barrels of liquid butadiene per day. It is better than 98% purity.

The desorbed reagent at 200° F. is cooled to 50° F. in cooler 29 by means of the naphtha leaving absorber 4A by means of line 31, which removes heat at the rate of 428,000 B. t. u. per hour and heats the naphtha to −10° F., and is then fed to absorber 4A to complete the cycle. The naphtha leaving cooler 29 is cooled down to −30° F. in cooler 11A and recycled.

The residue gas leaves absorber 4A via line 5 and is essentially butadiene-free. It amounts to about 227 barrels per day.

While the invention is primarily applicable to butadiene recovery, it may be applied to the recovery of higher diolefins such as isoprene, piperylene, etc.

A great many advantages flow from the practice of my invention. Among them is the fact that continuous recovery of high purity butadiene is accomplished without sacrificing any of the advantages of use of a solid reagent. Another is that the heat exchange problem when using a solid reagent is completely overcome. The invention brings about most intimate contact of the reagent and the diolefin-containing stream. By virtue of the agitation provided, better contact and faster absorption, desorption and reagent cooling are attained. Better temperature control results. The tremendous amount of heat to be transferred—in the case of butadiene, about 566 B. t. u. per pound of butadiene as heat of reaction plus about 100 B. t. u. as heat of vaporization or liquefaction—is readily taken care of. adjusting the rotative speed of the conveyors, the surge vessels allowing for any temporary variations in flow rate. Good heat transfer is provided by virtue of the agitation and use of the screw conveyor itself as the heat exchange surface, even though heat transfer to a solid is involved.

Numerous other advantages will be immediately apparent to those skilled in the art.

In this specification and in the appended claims the terms "absorption" and "desorption" are used in their ordinary meaning in this art, namely to designate respectively the chemical combination of cuprous halide with aliphatic conjugated diolefin to form an addition compound and the decomposition of said addition compound to regenerate said diolefin.

I claim:

1. Apparatus for the continuous recovery of aliphatic conjugated diolefins from hydrocarbon fluids containing the same by absorption in a solid reagent containing a cuprous halide and subsequent desorption of said diolefin from said reagent comprising, in combination, an absorption unit comprising a first closed pressure-sealed chamber having an inlet and an outlet for said reagent, an inlet for said fluid and an outlet for treated fluid, means for moving said reagent through said chamber, means carried by said moving means and forming a closed passageway for the circulation of a cooling medium in indirect heat exchange relation with the reagent being moved through said chamber, means for passing a cooling medium through said passageway, a desorption unit comprising a second closed pressure-sealed chamber having an inlet and an outlet for said reagent and an outlet for desorbed diolefin, means for moving said reagent through said second chamber, means carried by said last-named moving means and forming a closed passageway for the circulation of a heating medium in indirect heat exchange relation with the reagent being moved through said second chamber, means for passing a heating medium through said passageway, and means for transferring reagent leaving said first chamber to said second chamber.

2. The apparatus of claim 1 additionally including a reagent cooling unit comprising a third chamber having an inlet and an outlet for reagent, means for moving said reagent through said third chamber, means forming a closed passageway for the circulation of a cooling medium in indirect heat exchange relation with the reagent being moved through said third chamber, means for passing a cooling medium through said passageway, means for transferring reagent leaving said second chamber to said third chamber, and means for transferring cooled reagent leaving said third chamber to said first chamber.

3. The apparatus of claim 1 additionally including a relatively large closed chamber located in said transferring means intermediate said first and second chambers in such manner that said reagent during passage between said chambers traverses said relatively large closed chamber, said chamber functioning as a reagent accumulator and surge vessel, and means for evacuating said relatively large closed chamber for thereby removing residual non-diolefinic hydrocarbon therefrom.

4. The apparatus of claim 1 additionally including means associated with each end of said first chamber for effecting the continuous entry and exit of said reagent while substantially preventing entry and exit of fluid with said reagent.

5. Apparatus for the continuous recovery of aliphatic conjugated diolefins from hydrocarbon fluids containing the same by absorption in a solid reagent containing a cuprous halide and subsequent desorption comprising, in combination, an absorption unit comprising a closed pressure-sealed cylindrical screw conveyor shell having a reagent inlet, a reagent outlet, an inlet for said fluid, and an outlet for fluid from which the diolefin content has been absorbed, a screw type conveyor rotatably supported in said shell in such manner as to move solid reagent from the reagent inlet to the reagent outlet, said conveyor having internal passageways, and means for passing a cooling medium through said passageways to thereby effect cooling of said reagent by indirect heat exchange as it is moved through said shell, a desorption unit comprising a closed pressure-sealed cylindrical conveyor shell having a reagent inlet, a reagent outlet, and an outlet for desorbed diolefin, a screw type conveyor rotatably supported in said last-named shell, said conveyor having internal passageways, and means for passing a heating medium through said last-named passageways to thereby effect heating of said reagent by indirect heat exchange as it is moved through said shell, and means for continuously transferring the reagent leaving said absorption unit by the reagent outlet thereof to the reagent inlet of said desorption unit.

6. The continuous method of recovering aliphatic conjugated diolefins from hydrocarbon fluids containing the same which comprises continuously passing said fluid into intimate contact with a mass of a solid cuprous halide reagent in an absorption zone, cooling said mass in said zone to absorption temperature by indirect heat exchange by continuously passing cold heat exchange surfaces throughout the body of said mass while simultaneously moving and agitating said mass by means of said heat exchange surfaces, continuously feeding said reagent into said zone, passing it through said zone by means of said surfaces, and withdrawing it from said zone after traversal thereof, continuously transferring the reagent so withdrawn to a desorption zone, heating said reagent in said desorption zone to desorption temperature by indirect heat exchange by continuously passing hot heat exchange surfaces throughout the body of said reagent while simultaneously moving and agitating said reagent by means of said heat exchange surfaces, continuously feeding said reagent into said desorption zone, passing it through said zone by means of said hot heat exchange surfaces, and withdrawing it from said desorption zone after traversal thereof, and withdrawing the described diolefin from said desorption zone.

7. Apparatus for the continuous absorption of aliphatic conjugated diolefins from hydrocarbon fluids containing the same by means of a solid cuprous halide reagent comprising, in combination, a closed pressure-sealed chamber, an inlet at one end for admitting said reagent into said chamber, an outlet at the other end for allowing exit of said reagent, an inlet for said fluid adjacent one end, an outlet for treated fluid adjacent the other end, means associated with said reagent inlet for feeding reagent continuously into said chamber and preventing flow of fluid through said reagent inlet, means associated with said reagent outlet for removing reagent continuously from said chamber and preventing flow of fluid through said reagent outlet, mechanical conveyor means in said chamber for moving said reagent therethrough from said reagent inlet to said reagent outlet while agitating and intimately contacting said reagent with said fluid, means carried by said conveyor means forming a closed passageway for the circulation of a cooling medium in indirect heat exchange with said reagent being moved thereby, and means for passing a cooling medium through said passageway.

8. Apparatus for the continuous desorption of aliphatic conjugated diolefins from a solid cuprous halide reagent containing the same in combined form comprising, in combination, a closed pressure-sealed chamber, an inlet at one end for admitting said reagent into said chamber, an outlet at the other end for allowing exit of said reagent, an outlet for liberated diolefin, means associated with said reagent inlet for feeding reagent continuously into said chamber and preventing flow of fluid through said reagent inlet, means associated with said reagent outlet for removing reagent continuously from said chamber and preventing flow of fluid through said reagent outlet, mechanical conveyor means in said chamber for moving said reagent therethrough from said reagent inlet to said reagent outlet while agitating said reagent, means carried by said conveyor means forming a closed passageway for the circulation of a heating medium in indirect heat exchange with said reagent being moved thereby, and means for passing a heating medium through said passageway.

9. Apparatus for the continuous absorption of aliphatic conjugated diolefins from hydrocarbon fluids containing the same by means of a solid cuprous halide reagent comprising, in combination, a closed pressure-sealed cylindrical screw conveyor shell, an inlet at one end for admitting said reagent into said shell, an outlet at the other end for allowing exit of said reagent, an inlet for said fluid adjacent one end, an outlet for treated fluid adjacent the other end, a screw conveyor rotatably supported in said shell in such manner as to move said reagent from said reagent inlet to said reagent outlet, means associated with said reagent inlet for feeding reagent continuously into said chamber and preventing flow of fluid through said reagent inlet, means associated with said reagent outlet for removing reagent continuously therethrough and prevent flow of fluid therethrough, said conveyor having an internal passageway lengthwise thereof, and means for passing a cooling medium through said passageway to effect cooling of said reagent by indirect heat exchange with said reagent being moved by said conveyor.

10. Apparatus for the continuous desorption of aliphatic conjugated diolefins from a solid cuprous halide reagent containing the same in chemical combination comprising, in combination, a closed pressure-sealed cylindrical screw conveyor shell, an inlet at one end for admitting said reagent into said chamber, an outlet at the other end for allowing exit of said reagent, an outlet for liberated diolefin, a screw conveyor rotatably supported in said shell in such manner as to move said reagent from said reagent inlet to said reagent outlet while agitating said reagent, means associated with said reagent inlet for feeding reagent continuously into said chamber and preventing flow of fluid through said reagent inlet, means associated with said reagent outlet for removing reagent continuously and preventing flow of fluid through said reagent outlet, said conveyor having an internal passageway lengthwise thereof, and means for passing a heating medium through said passageway countercurrently to the movement of said reagent by said conveyor to thereby effect heating of said reagent by indirect heat exchange and desorption of the diolefin therefrom as said reagent is moved through said shell.

11. Apparatus of the character described comprising, in combination, a closed pressure-sealed cylindrical screw conveyor shell, inlet means for admitting solid reagent into said shell at one end thereof, outlet means for allowing exit of said reagent at the other end thereof, exit means for allowing exit of fluid from said shell at a point substantially removed from the ends thereof, a screw conveyor rotatably supported in said shell in such manner as to move said reagent from the reagent inlet to the reagent outlet, said conveyor having internal passageways, means for passing a heat exchange medium through said passageways to thereby control the temperature of said reagent by indirect heat exchange, the intermediate convolutions of said conveyor allowing relatively free passage of fluid therebetween, and the end convolutions of said conveyor engaging said shell in fluid-tight but slidable relationship and thereby preventing flow of fluid between the interior of said shell and said reagent inlet and outlet means.

12. Apparatus of the character described comprising, in combination, a closed pressure-sealed cylindrical screw conveyor shell, a reagent inlet at one end thereof, a reagent outlet at the other end thereof, outlet means for allowing exit of fluid from said shell and located at a point substantially removed from the ends of said shell, a screw conveyor rotatably supported in said shell in such manner as to move said reagent from said reagent inlet to said reagent outlet, said conveyor having internal passageways extending lengthwise thereof, means for passing a heat exchange medium through said passageways in indirect heat exchange with said reagent, means associated with said reagent inlet for feeding reagent continuously into said chamber and preventing flow of fluid through said reagent inlet, means associated with said reagent outlet for removing reagent continuously from said chamber and preventing flow of fluid through said reagent outlet, and transverse passageways in the flights of said screw conveyor for allowing free passage of fluid therethrough but preventing movement of reagent therethrough.

JOSEPH EDGAR STORMENT.